United States Patent [19]
Mitchell

[11] Patent Number: 5,437,538
[45] Date of Patent: Aug. 1, 1995

[54] PROJECTILE SHIELD

[75] Inventor: Stephen C. Mitchell, West Chester, Ohio

[73] Assignee: General Electric Company, Cincinnati, Ohio

[21] Appl. No.: 144,098

[22] Filed: Oct. 28, 1993

Related U.S. Application Data

[63] Continuation of Ser. No. 52,804, Apr. 26, 1993, abandoned, which is a continuation of Ser. No. 826,299, Jan. 27, 1992, abandoned, which is a continuation of Ser. No. 539,243, Jun. 18, 1990, abandoned.

[51] Int. Cl.[6] .................. F01D 25/24; F04D 29/40
[52] U.S. Cl. ........................ 415/9; 415/200; 428/105; 428/902; 428/911
[58] Field of Search ............... 428/902, 911, 105, 107; 415/9, 200

[56] References Cited

U.S. PATENT DOCUMENTS

| | | | |
|---|---|---|---|
| 2,899,987 | 8/1959 | Finken et al. | 428/911 |
| 2,999,667 | 9/1961 | Morley | 415/196 |
| 3,446,251 | 5/1969 | Dow | 139/383 R |
| 3,874,422 | 4/1975 | Dow | 139/383 R |
| 3,974,313 | 8/1976 | James | 428/176 |
| 4,071,647 | 1/1978 | McMullen | 428/107 |
| 4,265,981 | 5/1981 | Campbell | 428/591 |
| 4,425,080 | 1/1984 | Stanton et al. | 415/197 |
| 4,438,173 | 3/1984 | Trost | 428/902 |
| 4,452,563 | 6/1984 | Belanger et al. | 415/9 |
| 4,534,698 | 8/1985 | Tomich | 415/9 |
| 4,547,122 | 10/1985 | Leech | 415/9 |
| 4,584,228 | 4/1986 | Droste | 428/182 |
| 4,621,980 | 11/1986 | Reavely et al. | 428/105 |
| 4,699,567 | 10/1987 | Stewart | 415/200 |
| 4,902,201 | 2/1990 | Neubert | 415/197 |
| 4,961,685 | 10/1990 | Neubert | 415/9 |

FOREIGN PATENT DOCUMENTS

| | | |
|---|---|---|
| 0089537 | 9/1983 | European Pat. Off. |
| 265550A1 | 5/1988 | European Pat. Off. |
| 995228 | 6/1965 | United Kingdom |
| 2219633 | 12/1989 | United Kingdom |

*Primary Examiner*—Edward K. Look
*Assistant Examiner*—Michael S. Lee
*Attorney, Agent, or Firm*—Jerome C. Squillaro; David L. Narciso

[57] ABSTRACT

An improved blade containment structure including a projectile shield having a braided ballistic fabric is disclosed. The braided fabric includes ballistic strands arranged in a preferred orientation and is effective for increasing the ability of the fabric to contain projectiles and absorb energy therefrom. The braided ballistic fabric provides substantial improvement in performance over conventional woven ballistic fabrics.

18 Claims, 4 Drawing Sheets

PROJECTILE SHIELD

This application is a Continuation of application Ser. No. 08/052,804, now abandoned, filed Apr. 26, 1993, which is a Continuation of application Ser. No. 07/826,299, now abandoned, filed Jan. 27, 1992, which is a Continuation of application Ser. No. 07/539,243, now abandoned, filed Jun. 18, 1990.

BACKGROUND OF THE INVENTION

The present invention relates generally to projectile shields, and, more specifically, to a projectile shield usable, for example, in a blade containment structure for a gas turbine engine which is effective for absorbing energy and containing projectiles hurled upon damage to rotating parts.

Gas turbine engines include rotating blades which, if broken, become projectiles which are hurled radially outwardly from the engine. Blade containment structures may be used as a shield for containing such projectiles and thereby reducing damage to the engine and to the aircraft supporting the engine.

Conventional blade containment structures include, for example, metal, resin impregnated glass fiber, carbon fiber, ballistic nylon, glass fiber tape, or aromatic polyamide fibers such as Kevlar, or other ballistic strands which may be provided in layers for increasing the energy absorbing capability of containment structure.

Woven ballistic strands especially without the use of a resin matrix, have a known disadvantage in that individual strands tend to be pushed apart by a projectile upon impact which allows the projectile to more readily penetrate the woven ballistic fabric. Accordingly many layers of such fabric are typically provided to ensure that a projectile of predetermined energy is unable to pass through all the layers of the ballistic fabric.

OBJECTS OF THE INVENTION

Accordingly, one object of the present invention is to provide a new and improved projectile shield.

Another object of the present invention is to provide a projectile shield including a new and improved ballistic fabric having improved resistance to ballistic strand separation upon projectile impact.

Another object of the present invention is to provide a blade containment structure for a gas turbine engine including a new and improved projectile shield.

Another object of the present invention is to provide a blade containment structure for gas turbine engine having a projectile shield comprising a ballistic fabric having high energy absorbing capability.

SUMMARY OF THE INVENTION

According to a preferred embodiment of the present invention, a projectile shield includes a ballistic fabric having a plurality of interlaced ballistic strands and means for scissoring adjacent strands upon impact of the fabric by a projectile so that the adjacent strands are moved toward each other. In an exemplary embodiment, the projectile shield is used in a blade containment structure for a gas turbine engine and the ballistic fabric comprises braided ballistic strands.

BRIEF DESCRIPTION OF THE DRAWING

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

DETAILED DESCRIPTION

Figure 1:
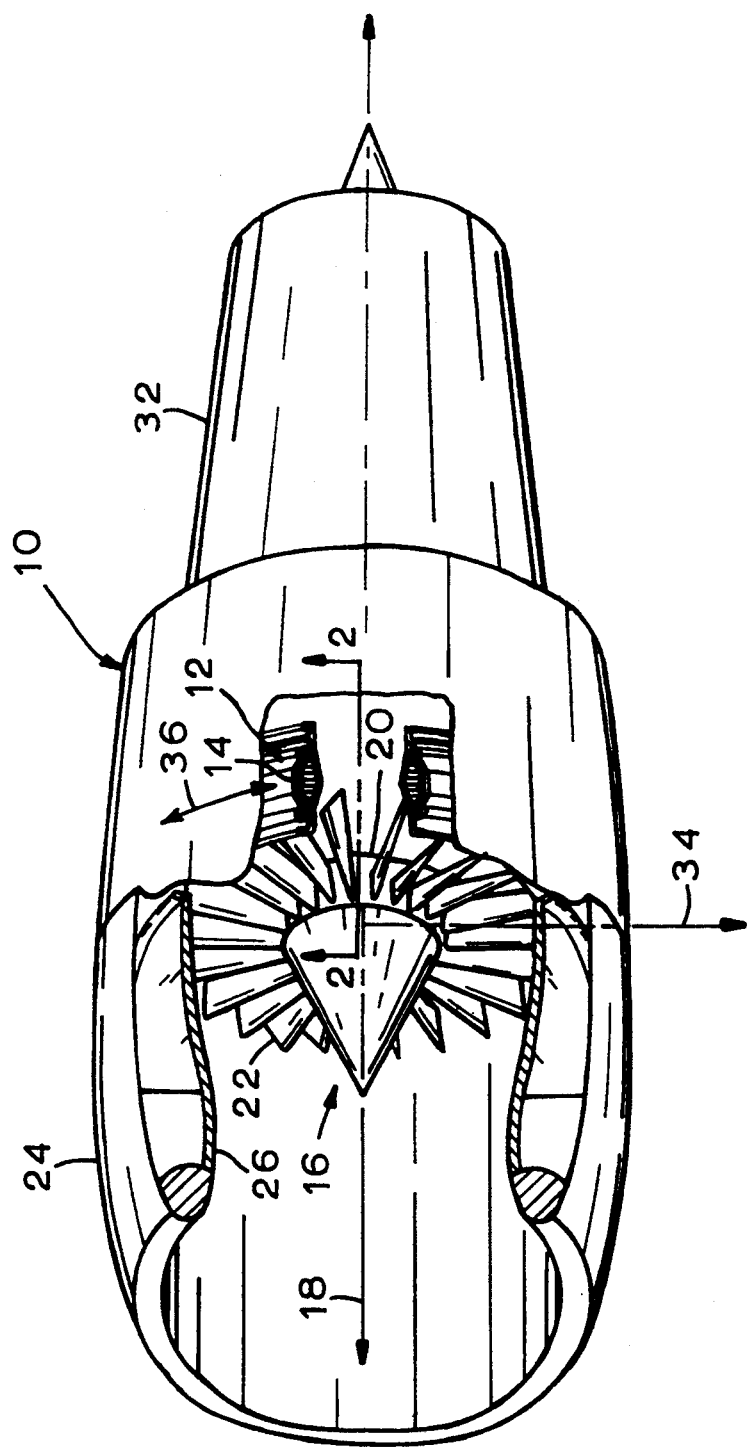
FIG. 1 is a partly sectional perspective view of a gas turbine engine having a blade containment structure including a projectile shield in accordance with one embodiment of the present invention.

Illustrated in FIG. 1 is an otherwise conventional gas turbine engine 10 including a blade containment structure 12 having a projectile shield 14 in accordance with a preferred and exemplary embodiment of the present invention.

Figure 2:
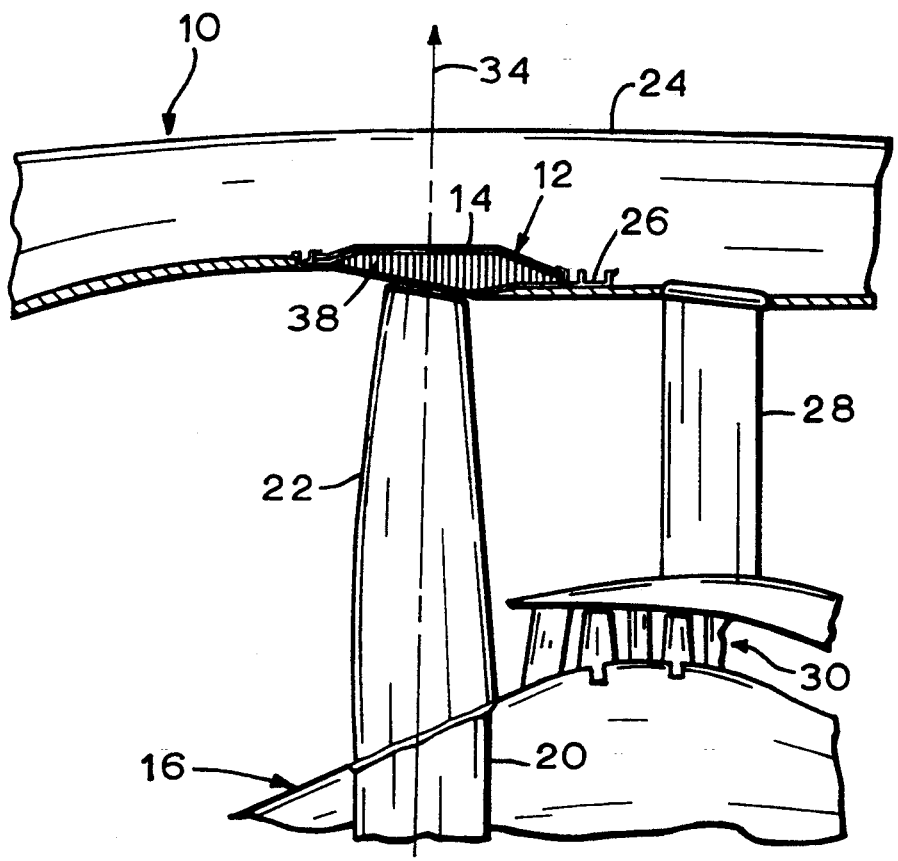
FIG. 2 is a sectional view taken along line 2—2 of FIG. 1 illustrating a fan assembly surrounded by one embodiment of the blade containment structure including a projectile shield according to the present invention.

Referring to both FIGS. 1 and 2, the engine 10 includes a conventional fan assembly 16 which is rotatable about a longitudinal, axial centerline axis 18. The fan assembly 16 includes a rotor disk 20 having a plurality of radially outwardly extending fan blades 22 conventionally secured thereto. The engine 10 also includes a conventional nacelle 24 conventionally connected to an annular inner casing 26. The inner casing 26 conventionally supports the fan assembly 16 through a plurality of circumferentially spaced struts 28 and through a conventional booster fan assembly 30. A conventional core engine 32 is conventionally connected to the fan assembly 16 for rotating the fan blades 22 to accelerate intake air for providing thrust from the engine. A conventional radial axis 34 extends perpendicularly outwardly from the axial axis 18, and a circumferential direction 36 extends around a circle disposed in a plane perpendicular to the axial axis 18.

The blade containment structure 12 in accordance with one embodiment of the invention surrounds the disk 20 and the blades 22 and includes the annular inner casing 26 surrounding the fan blades 22. The structure 12 also includes a conventional honeycomb member 38 which provides structural stiffness and support for the inner casing 26, and an outer shell 39 surrounding the honeycomb member 38. The outer shell 39 prevents direct contact between the honeycomb member 38 and the shield 14 to reduce the possibility of the honeycomb member 38 cutting the shield 14 during a projectile incident. The inner casing 26 may be metal, such as aluminum or steel, for example; the honeycomb material 38 may be metal, such as aluminum, for example; and the outer shell 39 may be metal or a conventional graphite epoxy structure. The honeycomb member 38 is conventionally fixedly secured to the inner casing 26 and the outer shell 39, for example, by conventional adhesive bonding.

Figure 3:
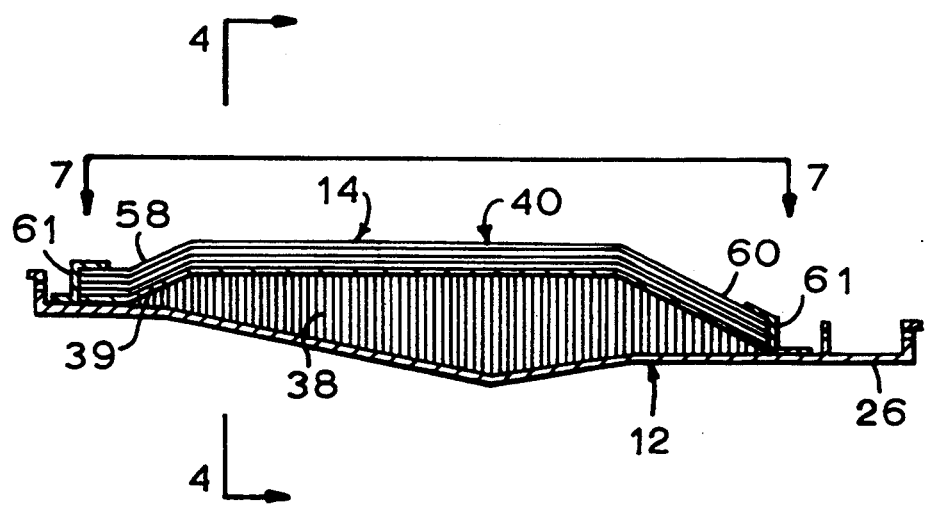
FIG. 3 is an enlarged sectional view of the blade containment structure illustrated in FIG. 2.
Figure 4:
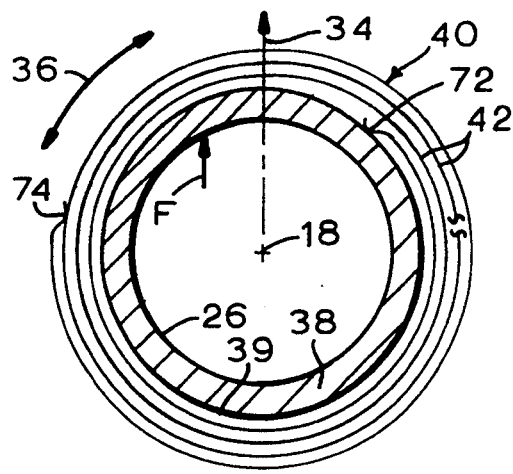
FIG. 4 is a schematic representation of a sectional view of FIG. 3 taken along line 4—4 illustrating a plurality of layers of a ballistic fabric of the projectile shield in accordance with one embodiment of the invention.

As illustrated in FIGS. 3 and 4 the projectile shield 14 comprises a ballistic fabric 40 which includes a plurality of layers 42 wrapped tightly around the shell 39 and honeycomb 38 in generally the circumferential direction 36. The ballistic fabric 40 is preferably continuous and spirals around the inner casing 26 and the honeycomb 38 for forming the plurality of layers 42.

Figure 5:
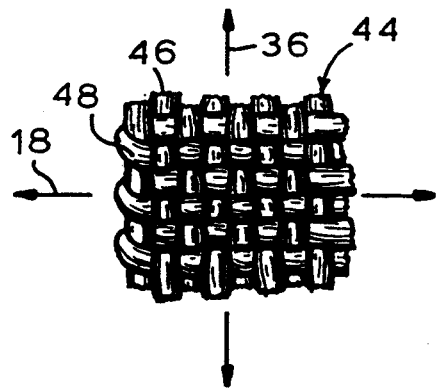
FIG. 5 is a portion of a prior art woven ballistic fabric.

In order to more fully appreciate the significance of the present invention, a section of a conventional prior art woven ballistic fabric 44 is illustrated in FIG. 5. The conventional woven fabric 44 includes a plurality of warp strands 46 interwoven perpendicularly to a plurality of fill strands 48. FIG. 5 also illustrates an exemplary orientation of the woven ballistic fabric 44 in gas turbine engines such as the engine 10 wherein the warp strands 46 are disposed generally parallel to the circumferential direction 36 and the fill strands 48 are disposed generally parallel to the axial axis 18.

Figure 6:
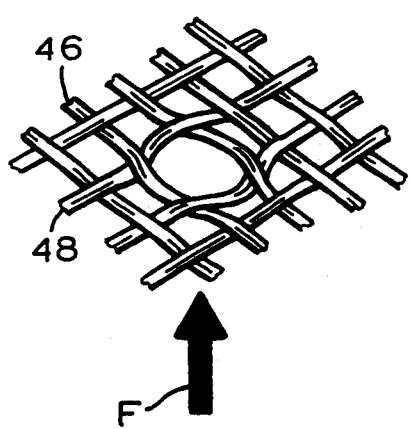
FIG. 6 is an enlarged view of the prior art woven ballistic fabric illustrated in FIG. 5 showing spreading of fibers upon impact of a projectile force F.

Illustrated in FIG. 6 is an exemplary representation of the woven ballistic fabric 44 of FIG. 5 enlarged to illustrate the application of a projectile force F upon the warp and fill strands 46 and 48. The center of FIG. 6 illustrates that the strands 46 and 48 are caused to be separated, or spread apart, upon application of a projectile force. Accordingly, a plurality of layers of such a conventional woven ballistic fabric 44 is typically used in a gas turbine engine application to ensure that enough layers are provided for absorbing energy associated with a projectile, formed, for example, by the breaking apart of fan blades, and for containing such projectile. Typically, during a projectile incident, many of the layers of woven ballistic fabric 44 are damaged with the projectile passing through the layers while losing energy until all energy is dissipated and the projectile is unable to pass through any remaining layers.

It has been discovered that the ballistic fabric 40 in accordance with the present invention can provide improved containment capability which when compared pound for pound to conventional woven fabric 44 made from identical materials, less material by weight of the ballistic fabric 40 is required to contain identical projectiles with identical energy. The ballistic fabric 40 in accordance with the present invention has the capability to restrain spreading or pushing apart of its strands upon projectile impact and thus provide an improvement over conventional woven fabrics 44.

Figure 7:
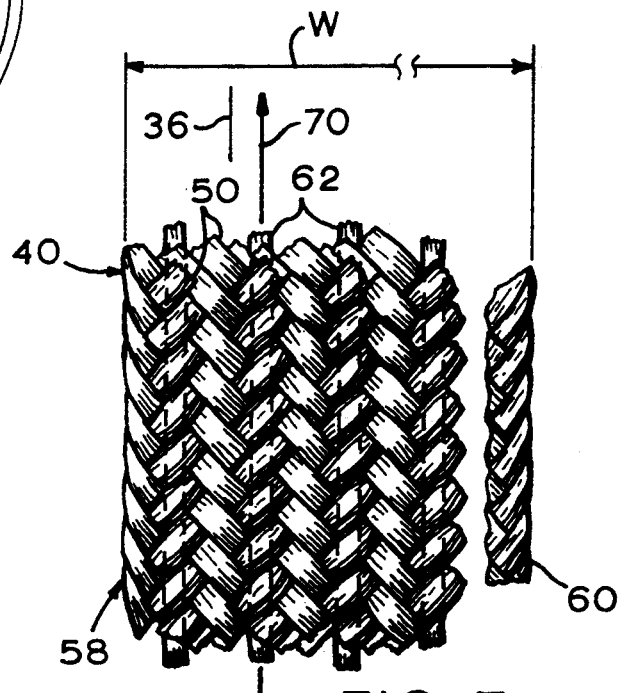
FIG. 7 is a plan view of a braided ballistic fabric in accordance with one embodiment of the invention as illustrated along line 7—7 of FIG. 3.

More specifically, the ballistic fabric 40 in accordance with one embodiment of the present invention preferably comprises a plurality of braided ballistic strands 50 which are disposed diagonally with respect to each other as illustrated in FIG. 7.

Figure 9:
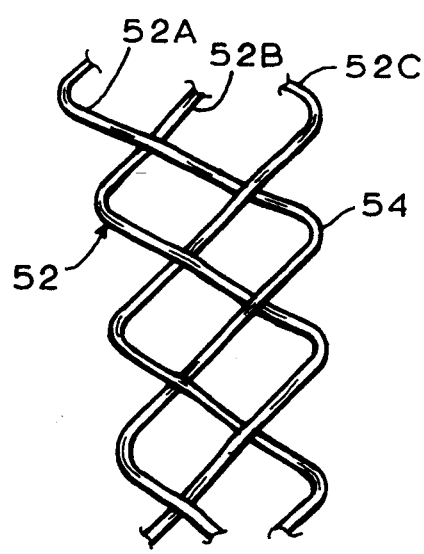
FIG. 9 is an exploded view of a simple three strand braid.

Illustrated in FIG. 9, however, is the simplest form of a conventional braid of strands 52 wherein three strands 52A, 52B and 52C are braided. It is noted that one strand is interlaced over another strand and then under the remaining strand and is bent and then the pattern is repeated. For example, the strand 52A passes over (overlaps) the strand 52B and then passes under (overlaps) the strand 52C, then forms a bend 54 for being interlaced over strand 52B, and then under the strand 52C. A similar pattern of interlacing is followed by each of the strands 52B and 52C.

The braided fabric 40 illustrated in FIG. 7 is more complex than the simple braid illustrated in FIG. 9 but can be made with conventional equipment. Referring to additionally FIG. 8, it is noted that the braided strands 50 are interlaced in an overlapping pattern wherein each of the braided strands 50, strand 50A, for example, is positioned under two adjacent strands 50B and 50C and over two adjacent strands 50D and 50E in turn in one direction. The term "overlapping" as used herein simply means one strand passing over or under an adjacent strand. The exemplary strand 50A forms a bend 56 at a first edge 58 of the fabric 40 where it turns direction and heads into the fabric where it is interlaced over two adjacent strands 50F and 50G and under two adjacent strands 50H and 50I in turn. All of the bends of 56 formed by strands 50 collectively define the first edge 58 which is disposed as a straight line. As shown in FIG. 7, the strands 50 similarly define a second edge 60 at the side opposite to the first edge 58.

In the preferred embodiment, as illustrated in FIG. 3, the first and second edges 58 and 60 are fixedly connected to the inner casing 26 by local conventional adhesive bonding. More specifically, the edges 58 and 60 are wetted-out, or impregnated, with a conventional epoxy adhesive for a short axial distance, of about one inch for example, so that after being wound around the outer shell 39 during assembly and after being cured, they each collectively form a relatively stiff edge 58 and 60, respectively. A Z-shaped annular bracket 61 suitably secured to the inner casing 26 may be provided at each of the edges 58 and 60 in the preferred embodiment so that the edges 58 and 60 are additionally bonded thereto during the above described assembly process.

Figure 8:
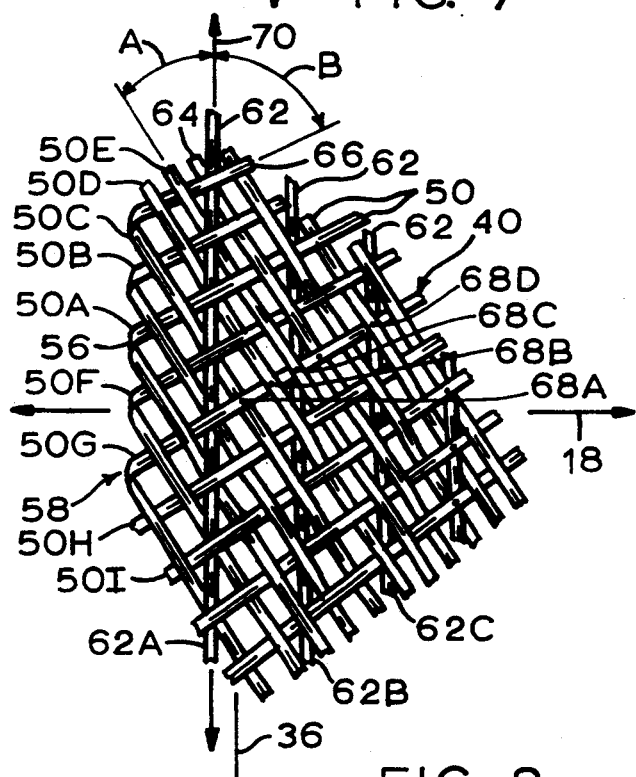
FIG. 8 is an enlarged view of a portion of the braided ballistic fabric illustrated in FIG. 7 exploded for showing details.

The fabric 40 preferably also includes a plurality of mutually parallel ballistic strands interlaced in the fabric 40 as illustrated in FIGS. 7 and 8. The braided strands 50 are preferably disposed diagonally with respect to the parallel strands 62 and in a preferred embodiment are disposed at an angle thereto of up to about thirty degrees (30°) for accommodating circumferential loads and obtaining scissoring action. In other embodiments, angles greater than 30° could be used as desired. FIG. 8 illustrates the relationship wherein the angle between a parallel strand 62 and a first diagonal strand 64 designated as A is up to and preferably about 30°. A second diagonal strand 66 of the ballistic strands 50, which diagonally overlaps the first strand 64, is disposed at an angle B from the parallel strand 62 which is up to and preferably about 30°.

As further illustrated in FIG. 8, the parallel strands 62 are spaced from each other at each third overlap of the braided strands 50. More specifically, disposed at a third overlap from a first parallel strand 62A is a second parallel strand 62B wherein the first overlap is designated 68A, the second overlap is designated 68B and the third overlap is designated 68C. However, parallel strands 62 may be spaced either closer together or further apart. For example, in an alternate embodiment, the parallel strand 62 may be spaced from each other at each sixth overlap of the braided strands 50 which is used in a preferred embodiment. In such an embodiment, a third parallel strand 62C, as illustrated in FIG. 8, is disposed at a sixth overlap 68D, and the second strand 62B would not be used. Of course, a plurality of strands 62 are spaced from the first edge 58 to the second edge 60.

The braided fabric 40 preferably comprises an elongate ribbon of the braided and parallel ballistic strands 50 and 62 having a corresponding longitudinal axis 70 which extends along the length of the fabric, or ribbon, 40. The ribbon 40 further includes a width W (as illustrated in FIG. 7) which is disposed perpendicularly to the longitudinal axis 70 and the first and second edges 58 and 60 and extends therebetween. The parallel strands 62 are preferably disposed parallel to the longitudinal axis 70 and similarly, the first and second edges 58 and 60 are also disposed parallel to the longitudinal axis 70. The manner of braiding the ballistic strands 50 into the ballistic fabric 40 as above described and as illustrated in FIGS. 7 and 8 is conventionally known and is represented by the designation tri-axis braiding.

The ribbon 40 has a preferred orientation in the blade containment structure 12 in the gas turbine engine 10. More specifically, the projectile shield 14 including the ribbon 40 is disposed so that the parallel ballistic strands 62 are disposed circumferentially around the inner casing 26 and the honeycomb 28 as illustrated in FIGS. 1, 3, 4, 7 and 8 parallel to the circumferential direction 36. Referring to FIGS. 7 and 8, it is noted that the longitudinal axis 70 of the ribbon 40 is preferably oriented parallel to the circumferential direction 36 when installed in the blade containment structure 12. Therefore, the braided strands 50 are then disposed diagonally to the circumferential direction 36. For example, braided strands 64 and 66 are disposed at angles up to and preferably about 30° on opposite sides of the circumferential direction 36, which may be designated as plus and minus degrees relative thereto.

In this arrangement, the parallel strands 62 are disposed in the circumferential direction 36 or the hoop stress direction associated with the annular blade containment structure 12. In this orientation, the parallel strands 62 are most effective for resisting the circumferential reaction forces in the ribbon 40 upon impact of a projectile such as a fragment of a blade 22 hurled radially outwardly. FIG. 4 also illustrates an example of the impact trajectory of such a fragment projectile designated by a force F. The parallel strands 62 are preferably continuous for better accommodating reaction hoop stress in the parallel strands 62. In such an embodiment, the strands 62 are effective for absorbing energy and also for limiting radially outward deflection.

As illustrated in FIG. 4, the fabric 40 includes a first end 72 and an opposite second end 74 and the first and second ends are fixedly connected in a preferred manner. More specifically, the first end 72 also is wetted-out, or impregnated with the conventional epoxy adhesive for a short circumferential distance of about one inch for bonding the first end 72 to the outer shell 39 during the initiation of assembly. The ribbon 40 is then wound, or wrapped, around the shell 39 for the desired number of layers 42 which contact each other (only some of which are shown). The second end 74 can also be similarly impregnated with the epoxy adhesive to fixedly secure it to the preceding layer 42. A conventional outer cover (not shown) such as metal or graphite epoxy, may be disposed around the ribbon 40 to protect it from contamination from any leaking fluids. Preferably, however, the second end 74 comprises the final outer layer, or wrap, of the ribbon 40. It is impregnated with the conventional epoxy adhesive, or resin, which cures to form the outer cover, or sealing layer, bonded to the preceding layer 42.

Figure 10:
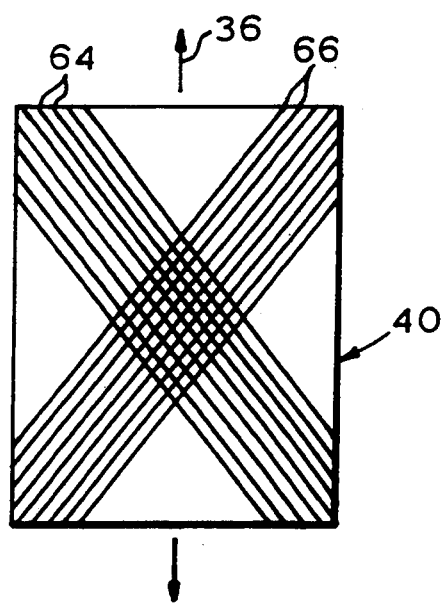
FIG. 10 is a schematic representation of the braided ballistic fabric illustrated in FIGS. 7 and 8 showing several diagonally intersecting strands.
Figure 11:
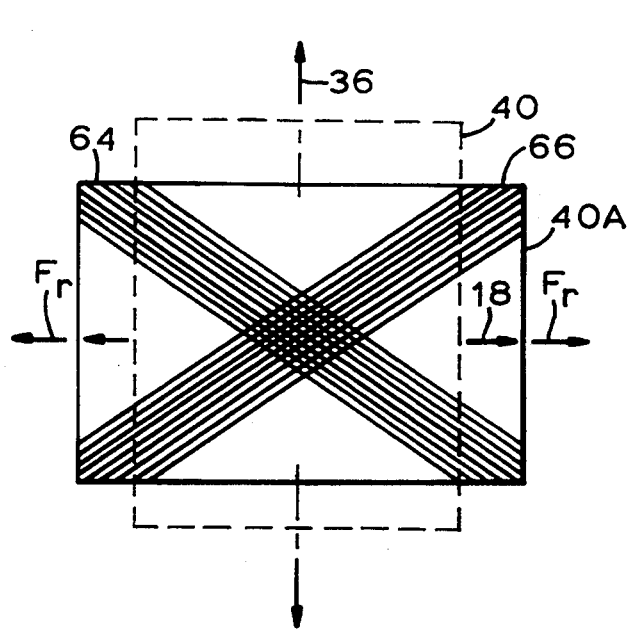
FIG. 11 is a schematic representation of the braided ballistic fabric illustrated in FIGS. 7 and 8 shown subject to application of axial tension forces.

Illustrated in FIG. 10 is a schematic representation of a section of the ribbon 40 illustrating the diagonally oriented braided strands 64 and 66. Illustrated in FIG. 11 is a schematic representation of the ribbon 40 shown in dotted line in its undeformed state and in solid lines in a deformed state designated 40A due to a reaction tension force $F_r$ in the axial plane 18, which reaction force $F_r$ is due to a projectile impacting the fabric 40 generally obliquely thereto (such impact direction being as shown in FIG. 6, for example). It will be noted that the ribbon 40 elongates in the axial direction 18 and contracts in the circumferential direction 36 which may be considered scissoring. In other words, the adjacent braided strands 64 and 66 scissor upon impact of the ribbon 40 by a projectile and the adjacent strands 64 and 66 move or tend to move toward each other, thereby decreasing the space therebetween and resisting or restraining the tendency of the strands 64 and 66 to spread or push apart.

Figure 12:
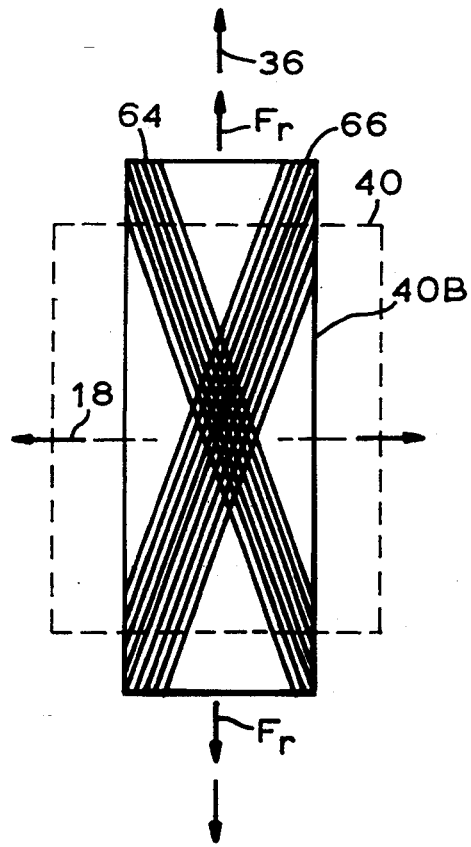
FIG. 12 is a schematic representation of the braided ballistic fabric illustrated in FIGS. 7 and 8 illustrating application of circumferential tension forces.

Similarly, FIG. 12 illustrates the application of the projectile and shows a reaction tension force $F_r$ in the circumferential direction 36 and the ribbon designated 40B elongates in the circumferential direction 36 and contracts in the axial direction 18. The adjacent braided strands 64 and 66 also scissor and move or tend to move toward each other and thereby decrease the spacing therebetween to similarly restrain the strands 64 and 66. Of course, during actual impact of a projectile, the ribbon 40 will behave with a combination of the scissoring illustrated in FIGS. 11 and 12. Testing and visual and photographic observations have shown that this scissoring action under impact by a projectile causes adjacent ones of the braided strands 64 and adjacent ones of the braided strands 66 to move closer together instead of further apart. Accordingly, the fabric 40 is considered to include means for scissoring adjacent strands upon impact of the fabric 40 by a projectile so that the adjacent braided strands are moved toward each other. For example, the scissoring causes adjacent ones of the braided strands 64 to move toward each other and adjacent ones of the braided strands 66 to move toward each other. Of course, at the actual impact site of a projectile, the interreaction mechanism is complex, and the projectile, in some situations, will penetrate some of the layers of the ribbon 40. However, the ballistic strands 50 in the immediate vicinity of the impact site behave as above described for providing improved energy absorbing capability for acting as a projectile shield.

The strands 50 and 62 which comprise the braided fabric 40 may be made from any conventionally known ballistic material which is effective for accommodating high values of tension and absorbing energy from projectile impact. Such strands are typically lightweight, high strength, synthetic fibers such as carbon and glass fibers and those mentioned above. In the preferred embodiment, the strands comprise an aromatic polyamide fiber such as Kevlar 49 which is a commercially known synthetic fiber manufactured by E. I. DuPont.

Tests were conducted of conventional woven ballistic fabric comprising Kevlar 49 and of the braided ballistic fiber 40 also comprising Kevlar 49. For a particular design application, a conventional woven ballistic fabric such as that illustrated in FIG. 5 was used and compared with the braided ballistic fabric 40 as illustrated in FIGS. 7 and 8. Extrapolation of flat panel and half casings tests indicated that a woven fabric 44 of Kevlar 49 having a width of 22 inches and 67 layers and weighing 155 pounds will be comparable in containment performance to the braided fabric 40 of Kevlar 49 in a width of 22 inches having only 10 layers weighing 119 pounds. This represents about a 23% weight savings for comparable ballistic protection.

The braided strands 50 and the parallel strands 62 may be configured in any appropriate and conventional arrangement. For example, the strands 50 and 62 in the preferred embodiment were in the form of conventional tows each of which comprises a plurality of individual filaments which are untwisted. The strands 50 and 62 can comprise any form such as twisted or untwisted bundles of individual filaments as desired for particular applications.

Furthermore, the braided fabric 40 is closely braided so that the strands 50 contact each other, preferably as close as possible, and the individual layers 42 also contact each other as close as possible. However, no resin matrix is used to form a generally solid fabric 40 because scissoring action might be restricted, although in alternate forms of the invention conventional resin matrices might be desirable for forming a completely solid fabric 40. Since no resin matrix is used, the individual strands are relatively free to slide and move relative to each other for providing enhanced scissoring. In this regard, it is noted that the first and second edges 58 and 60 are only locally impregnated with the epoxy adhesive so that the strands 50 between the edges 58 and 60 are free to slide and allow scissoring to occur. Similarly, the first and second ends 72 and 74 are also locally impregnated with the epoxy adhesive so that the layers 42 and strands therebetween are also free to slide and allow scissoring to occur. During a projectile incident, the first and second edges 58 and 60, as well as possibly the first and second ends 72 and 74, may break free due to the impact force F, but the fabric 40 will nevertheless effectively resist the projectile.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, other types of braiding of the fabric 40 could be used, with or without the parallel strands 62, for obtaining the preferred scissoring. The angles A and B of the diagonal strands 64 and 66 could also be varied from the preferred 30°, either smaller or larger, depending upon particular design applications. Other gas turbine engine applications having different dimensions and number of fabric layers could be used with an expectation of similar performance improvements using the braided fabric over the woven fabric. Other exemplary ballistic strands include KEVLAR 29 by E. I. DuPont and SPECTRA 1000, a thermoplastic made by Allied Signal. Since non-metallic ballistic strands have relatively low temperature applications, less than about 400° for example, metallic braided ballistic strands could also be used for higher temperature capability. Such metallic strands could include steel, titanium, or nickel alloys.

Having thus described the preferred embodiments of the invention, what is claimed as novel and desired to be secured by Letters Patent of the United States is the invention as defined and differentiated in the following claims.

I claim:

1. A projectile shield comprising a ballistic fabric including a plurality of interlaced ballistic strands and a plurality of mutually parallel ballistic strands interlaced with said interlaced strands, said interlaced ballistic strands being interlaced in an overlapping pattern wherein each of interlaced strands is positioned under two adjacent ones of said interlaced strands and over two adjacent ones of said interlaced strands in turn and disposed diagonally with respect to said parallel ballistic strands, wherein said ballistic fabric is able to absorb the energy of an impact upon said fabric by a projectile through the scissoring action of adjacent interlaced ballistic strands, whereby said adjacent interlaced ballistic strands move toward each other and decrease the space therebetween.

2. A projectile shield according to claim 1 wherein said parallel strands are continuous.

3. A projectile shield according to claim 1 wherein said braided strands are disposed diagonally with respect to said parallel strands at an angle thereto of up to about 30°.

4. A projectile shield according to claim 1 wherein said parallel ballistic strands are spaced from each other at each third overlap of said braided strands.

5. A projectile shield according to claim 1 wherein said ballistic fabric comprises aromatic polyamide ballistic strands.

6. A projectile shield according to claim 5 wherein said strands comprise Kevlar 49.

7. A projectile shield according to claim 6 wherein said ballistic fabric comprises an elongate ribbon of said braided and parallel ballistic strands having a corresponding longitudinal axis and said parallel ballistic strands are disposed parallel to said longitudinal axis.

8. A projectile shield according to claim 7 wherein said ribbon includes first and second opposite edges extending parallel to said longitudinal axis and said first and second edges are defined by bends of said braided strands.

9. A blade containment structure for surrounding a rotatable disk including a plurality of blades extending radially outward therefrom in a gas turbine engine, comprising:

an annular inner casing surrounding said blades; and
an annular projectile shield disposed radially outwardly of said inner casing, said projectile shield further comprising a ballistic fabric including a plurality of interlaced ballistic strands and a plurality of mutually parallel ballistic strands interlaced with said interlaced ballistic strands, said interlaced ballistic strands being interlaced in an overlapping pattern wherein each or said interlaced strands is positioned under two adjacent ones of said interlaced strands and over two adjacent ones of said interlaced strands in turn and diagonally with respect to said parallel ballistic strands, wherein said ballistic fabric is able to absorb the energy of an impact upon said fabric by a projectile through the scissoring action of adjacent interlaced ballistic strands, whereby said adjacent interlaced ballistic strands move toward each other and decrease the space therebetween.

10. A blade containment structure according to claim 9 wherein said parallel ballistic strands are disposed circumferentially around said inner casing.

11. A blade containment structure according to claim 10 wherein said braided strands are disposed diagonally with respect to said parallel strands at an angle thereto of about 30°.

12. A blade containment structure according to claim 9 wherein said ballistic fabric comprises an elongate ribbon of said braided and parallel ballistic strands having a corresponding longitudinal axis disposed circumferentially around said inner casing and parallel to said parallel ballistic strands.

13. A blade containment structure claim 12 wherein said ribbon is disposed in a plurality of layers surrounding said inner casing.

14. A blade containment structure according to claim 12, wherein said ribbon elongates in the axial direction and contracts in the circumferential direction when the reaction tension force of a projectile is in the axial direction.

15. A blade containment structure shield according to claim 12, wherein said ribbon elongates in the circumferential direction and contracts in the axial direction when the reaction tension force of a projectile is in the circumferential direction.

16. A blade containment structure according to claim 9 wherein said ballistic strands comprise Kevlar 49.

17. A blade containment structure according to claim 9 further including an outer shell disposed adjacent to said projectile shield and an annular honeycomb member disposed between said outer shell and said inner casing.

18. A blade containment structure according to claim 17 wherein said first and second edges are fixedly connected to said inner casing and said ribbon includes a first end and an opposite second end relative to said longitudinal axis and said first and second ends are fixedly connected to said outer shell.

* * * * *